US00RE47875E

(19) United States
(12) Reissued Patent
Shiraga

(10) Patent Number: US RE47,875 E
(45) Date of Reissued Patent: Feb. 25, 2020

(54) MOBILE TERMINAL DEVICE, AND METHOD AND COMPUTER READABLE MEDIUM FOR THE SAME

(71) Applicant: Brother Kogyo Kabushiki Kaisha, Nagoya-shi, Aichi-ken (JP)

(72) Inventor: Naoto Shiraga, Nagoya (JP)

(73) Assignee: Brother Kogyo Kabushiki Kaisha, Nagoya-shi, Aichi-ken (JP)

(21) Appl. No.: 15/394,312

(22) Filed: Dec. 29, 2016

Related U.S. Patent Documents

Reissue of:
(64) Patent No.: 9,348,551
Issued: May 24, 2016
Appl. No.: 14/142,046
Filed: Dec. 27, 2013

(30) Foreign Application Priority Data

Dec. 27, 2012 (JP) ..... 2012-285178

(51) Int. Cl.
*G06F 3/12* (2006.01)
*H04N 1/00* (2006.01)
*H04B 5/00* (2006.01)

(52) U.S. Cl.
CPC ..... *G06F 3/1292* (2013.01); *H04B 5/0031* (2013.01); *H04N 1/00127* (2013.01); *H04N 1/00307* (2013.01)

(58) Field of Classification Search
CPC ..... G06F 3/1292; H04B 5/0031; H04N 1/00127; H04N 1/00307
See application file for complete search history.

(56) References Cited

U.S. PATENT DOCUMENTS 7,252,633 B2 8/2007 Obata et al.
8,189,225 B1 * 5/2012 Lo ..... G06F 3/122
(Continued)

FOREIGN PATENT DOCUMENTS

CN 1343063 A 4/2002
CN 101253469 A 8/2008
(Continued)

OTHER PUBLICATIONS

Jul. 6, 2017—U.S. Notice of Allowance—U.S. Appl. No. 15/280,742.
(Continued)

*Primary Examiner* — Joshua D Campbell
(74) *Attorney, Agent, or Firm* — Banner & Witcoff, Ltd.

(57) ABSTRACT

A mobile terminal device is provided, which includes a control device configured to acquire contents data, output screen data for controlling a display unit to display thereon images based on the acquired contents data, acquire, in response to an accepting unit accepting a selecting operation of selecting one or more images from among the images displayed on the display unit based on the screen data, image selection data for identifying specific contents data, of the acquired contents data, corresponding to the one or more images selected by the selecting operation, and transmit, in response to a near field wireless communication unit establishing near field wireless communication with a printer, a print instruction to print the specific contents data corresponding to the one or more images selected by the selecting operation, based on the acquired image selection data.

23 Claims, 8 Drawing Sheets

(56) References Cited

U.S. PATENT DOCUMENTS

| | | | | |
|---|---|---|---|---|
| 9,042,940 | B2 | 5/2015 | Suzuki et al. | |
| 9,094,780 | B2 | 7/2015 | Naruse | |
| 9,134,932 | B2 | 9/2015 | Shiraga | |
| 9,210,732 | B2 | 12/2015 | Suzuki | |
| 9,503,587 | B2 | 11/2016 | Naruse | |
| 2001/0034774 | A1 | 10/2001 | Watanabe et al. | |
| 2002/0105669 | A1 | 8/2002 | Watanabe et al. | |
| 2005/0270556 | A1 | 12/2005 | Shimamura | |
| 2007/0011679 | A1 | 1/2007 | Abe | |
| 2007/0013963 | A1 | 1/2007 | Nakamura | |
| 2007/0229857 | A1 | 10/2007 | Aiso | |
| 2009/0036056 | A1 | 2/2009 | Oshima et al. | |
| 2009/0091789 | A1 | 4/2009 | Hosotsubo | |
| 2009/0103124 | A1* | 4/2009 | Kimura et al. | G06F 3/1204 358/1.15 |
| 2009/0207428 | A1 | 8/2009 | Tanimoto et al. | |
| 2010/0020355 | A1 | 1/2010 | Imai | |
| 2010/0046026 | A1 | 2/2010 | Heo | |
| 2010/0069008 | A1* | 3/2010 | Oshima | H04W 4/02 455/41.3 |
| 2010/0097625 | A1 | 4/2010 | Kurihara | |
| 2010/0188695 | A1 | 7/2010 | Okigami | |
| 2010/0225962 | A1* | 9/2010 | Okigami | H04L 63/0492 358/1.15 |
| 2010/0231958 | A1 | 9/2010 | Okigami | |
| 2010/0321730 | A1 | 12/2010 | Tomi | |
| 2011/0026068 | A1 | 2/2011 | Yoshida | |
| 2011/0043857 | A1 | 2/2011 | Hiroki | |
| 2011/0063645 | A1 | 3/2011 | Sugino | |
| 2011/0292445 | A1 | 12/2011 | Kato | |
| 2012/0005378 | A1 | 1/2012 | Abe et al. | |
| 2012/0075664 | A1 | 3/2012 | Nichols et al. | |
| 2012/0154852 | A1 | 6/2012 | Hedberg | |
| 2012/0205432 | A1* | 8/2012 | Stone | G06Q 10/10 235/375 |
| 2012/0243041 | A1 | 9/2012 | Sakurai | |
| 2012/0246566 | A1 | 9/2012 | Shiraga | |
| 2012/0264372 | A1 | 10/2012 | Chen et al. | |
| 2013/0044341 | A1 | 2/2013 | Uchino | |
| 2013/0094047 | A1 | 4/2013 | Bailey et al. | |
| 2013/0141747 | A1 | 6/2013 | Oba et al. | |
| 2013/0215446 | A1 | 8/2013 | Imai | |
| 2013/0229690 | A1 | 9/2013 | Sumita et al. | |
| 2013/0231051 | A1 | 9/2013 | Naruse | |
| 2013/0235422 | A1 | 9/2013 | Nakata | |
| 2013/0258401 | A1 | 10/2013 | Suzuki | |
| 2013/0267277 | A1 | 10/2013 | Okigami | |
| 2014/0253964 | A1 | 9/2014 | Asai | |
| 2014/0268231 | A1 | 9/2014 | Ito | |
| 2014/0293348 | A1 | 10/2014 | Kai | |
| 2015/0288832 | A1 | 10/2015 | Naruse | |

FOREIGN PATENT DOCUMENTS

| | | | |
|---|---|---|---|
| CN | 101827363 | A | 9/2010 |
| CN | 101834656 | A | 9/2010 |
| CN | 102736870 | A | 10/2012 |
| CN | 103309633 | A | 9/2013 |
| EP | 1199627 | A2 | 4/2002 |
| EP | 2026195 | A2 | 2/2009 |
| JP | 2004-328275 | A | 11/2004 |
| JP | 2006-163791 | A | 6/2006 |
| JP | 2007-166538 | A | 6/2007 |
| JP | 2007-261042 | A | 10/2007 |
| JP | 2009-037566 | A | 2/2009 |
| JP | 2009-251823 | A | 10/2009 |
| JP | 2010-041580 | A | 2/2010 |
| JP | 2010177947 | A | 8/2010 |
| JP | 2012-32845 | A | 2/2012 |
| JP | 2012-039518 | A | 2/2012 |
| JP | 2012-160207 | A | 8/2012 |
| JP | 2012-203745 | A | 10/2012 |
| JP | 2013-041519 | A | 2/2013 |
| JP | 2013-187568 | A | 9/2013 |
| JP | 2014-127130 | A | 7/2014 |
| WO | 2010107125 | A1 | 9/2010 |

OTHER PUBLICATIONS

Jan 27, 2017—U.S. Non-Final Office Action—U.S. Appl. No. 15/280,742.
Extended EP Search Report dated Apr. 1, 2014, EP Appln. 13199178.8.
NFC Forum: "NFC Data Exchange Format (NDEF)—NDEF 1.0", Internet Citation, Jul. 24, 2006 (Jul. 24, 2006), XP002413994, Retrieved from the Internet: URL:http://www.nfc-forum.org/specs/spec_license/download_spec/0f5678c114d295e2da0d902f4e7839846281fc44/NFCForum-TS-NDEF_1.0.pdf [retrieved on Jan. 10, 2007].
May 13, 2016—U.S. Notice of Allowance—U.S. Appl. No. 14/228,317.
Jun. 6, 2016—U.S. Notice of Allowance—U.S. Appl. No. 14/697,377.
May 26, 2016 (CN) Notification of First Office Action—App 201410123834.1, Eng Tran.
Jun. 8, 2016—(CN) Notification of First Office Action—App 201410083473.2, Eng Tran.
May 16, 2017—(JP) Notification of Reasons for Rejection—App 2016-174320, Eng Tran.
Apr. 21, 2017—(CN) Notification of Reexamination—App 201310741160.7, Eng Tran.
Jul. 19, 2016—(CN) Decision of Rejection—App 201310741160.7, Eng Tran.
Mar. 2, 2018—U.S. Notice of Allowance—U.S. Appl. No. 15/790,108.
Jul. 17, 2018—U.S. Notice of Allowance—U.S. Appl. No. 15/790,108.
Jun. 21, 2018—(EP) Examination Report—App 13199178.8.
Apr. 26, 2018—(EP) Office Action—App 14152700.2.
May 13, 2019—U.S. Notice of Allowance—U.S. Appl. No. 15/624,272.
Apr. 22, 2019—(CN) Notification of First Office Action—App 201810597301.5, Eng Tran.
Jul. 8, 2019—U.S. Non-final Office Action—U.S. Appl. No. 15/715,875.
Jul. 23, 2019—(JP) Notification of Reasons for Rejection—App 2018-204888, Eng Tran.
Oct. 16, 2019—(EP) Extended Search Report—App 19177075.9.
Oct. 24, 2019—(EP) Extended Search Report—App 19186810.8.
Jan. 9, 2015—(EP) Extended EP Search Report—App 14152700.2.
Aug. 8, 2014—(US) Non-Final Office Action—U.S. Appl. No. 14/182,661.
Oct. 8, 2014—(US) Non-Final Office Action—U.S. Appl. No. 14/206,571.
Dec. 8, 2014—(US) Notice of Allowance—U.S. Appl. No. 14/182,661.
Jan. 7, 2015—(US) Notice of Allowance—U.S. Appl. No. 14/206,571.
Jan. 12, 2015—(US) Non-Final Office Action—U.S. Appl. No. 14/228,317.
Jun. 12, 2015—(CN) Notification of First Office Action—App 201310741160.7, Eng Tran.
Sep. 10, 2015—(US)—Non-Final Office Action—U.S. Appl. No. 14/697,377.
Oct. 22, 2015—(US)—Non-Final Office Action—U.S. Appl. No. 14/228,317.
Sep. 29, 2015—(JP) Notification of Reasons for Rejection—App 2013-073552, Eng Tran.
Jul. 6, 2015 (US) Final Office Action—U.S. Appl. No. 14/228,317.
Jan. 12, 2016—(JP) Notification of Reasons for Rejection—App 2013-051929, Eng Tran.
Feb. 9, 2016—(US) Final Office Action—U.S. Appl. No. 14/697,377.
Mar. 1, 2016—(US) Notice of Allowance—U.S. Appl. No. 14/228,317.
Feb. 26, 2016—(CN) Notification of the Second Office Action—App 201310741160.7, Eng Tran.
Feb. 23, 2016—(JP) Notification of Reasons for Rejection—App 2012-285178, Eng Tran.

* cited by examiner

MOBILE TERMINAL DEVICE, AND METHOD AND COMPUTER READABLE MEDIUM FOR THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION] *APPLICATIONS*

This application *is a Reissue of U.S. Pat. No. 9,348,551 issued on May 24, 2016* (*application Ser. No. 14/142,046 filed on Dec. 27, 2013*), *which* claims priority under 35 U.S.C. §119 from Japanese Patent Application No. 2012-285178 filed on Dec.27, 2012. The entire subject matter of [the application is ] *these applications are* incorporated herein by reference *in their entirety*.

*In addition, U.S. application Ser. No. 16/728,706 filed Dec. 27, 2019, is a continuation reissue of application Ser. No. 15/394,312 filed on Dec. 29, 2016. In addition, U.S. application Ser. No. 16/728,706 filed Dec. 27, 2019, is also a Reissue of U.S. Pat. No. 9,348,551 issued on May 24, 2016* (*application Ser. No. 14/142,046 filed on Dec. 27, 2013*).

BACKGROUND

1. Technical Field

The following description relates to one or more techniques to cause a mobile terminal device to transmit, to a printer, a print instruction to print images.

2. Related Art

Recently, a plurality of wireless communication systems have been applied to communication between a mobile terminal device (such as a smartphone and a tablet computer) and a printer having a printing function. Examples of the wireless communication systems include Bluetooth® (trademark registered by BLUETOOTH SIG, INC.), Wi-Fi® (trademark registered by Wi-Fi Alliance), and Near Field Communication (hereinafter, which may be referred to as NFC). As a wireless communication technique using the wireless communication systems, for instance, a so-called handover communication technique has been proposed. In the handover communication technique, initially, wireless communication is established via the NFC between the mobile terminal device and the printer, and then, the communication method is switched via the NFC from the NFC to another communication system capable of higher-speed data communication than the NFC.

Specifically, when data communication is performed between a first communication device and a second communication device, initially, the first communication device acquires a communication system and an encryption system from the second communication device via the NFC. Then, when the acquired communication system and the acquired encryption system are coincident with a predetermined communication system and a predetermined encryption system for the first communication device, respectively, the first communication device is allowed to perform data communication with the second communication device via another communication system capable of higher-speed data communication than the NFC.

SUMMARY

However, the proposed handover communication technique has the following problem. When the proposed handover communication technique is applied to the data communication between a mobile terminal device and a printer, even after wireless communication is established therebetween using the handover communication technique, a further user operation (such as inputting a print instruction) is required for execution of a printing operation after establishment of the wireless communication. Therefore, in this case, the proposed handover communication technique is not so user-friendly.

Aspects of the present invention are advantageous to present one or more improved techniques to allow a mobile terminal device to perform data communication with a printer in a user-friendly manner.

According to aspects of the present invention, a mobile terminal device is provided, which includes a display unit, a near field wireless communication unit, an accepting unit, and a control device configured to acquire contents data, output screen data for controlling the display unit to display thereon a plurality of images generated based on the acquired contents data, acquire, in response to the accepting unit accepting a selecting operation of selecting one or more images from among the plurality of images displayed on the display unit based on the screen data, image selection data for identifying specific contents data, of the acquired contents data, corresponding to the one or more images selected by the selecting operation, and transmit, in response to the near field wireless communication unit establishing near field wireless communication with a printer, a print instruction to print the specific contents data corresponding to the one or more images selected by the selecting operation, based on the acquired image selection data.

According to aspects of the present invention, further provided is a method configured to be implemented on a processor connected with a display unit, a near field wireless communication unit, and an accepting unit, the method including acquiring contents data, outputting screen data for controlling the display unit to display thereon a plurality of images generated based on the acquired contents data, acquiring, in response to the accepting unit accepting a selecting operation of selecting one or more images from among the plurality of images displayed on the display unit based on the screen data, image selection data for identifying specific contents data, of the acquired contents data, corresponding to the one or more images selected by the selecting operation, and transmitting, in response to the near field wireless communication unit establishing near field wireless communication with a printer, a print instruction to print the specific contents data corresponding to the one or more images selected by the selecting operation, based on the acquired image selection data.

According to aspects of the present invention, further provided is a non-transitory computer readable medium storing computer readable instructions configured to, when executed by a processor connected with a display unit, a near field wireless communication unit, and an accepting unit, cause the processor to perform acquiring contents data, outputting screen data for controlling the display unit to display thereon a plurality of images generated based on the acquired contents data, acquiring, in response to the accepting unit accepting a selecting operation of selecting one or more images from among the plurality of images displayed on the display unit based on the screen data, image selection data for identifying specific contents data, of the acquired contents data, corresponding to the one or more images selected by the selecting operation, and transmitting, in response to the near field wireless communication unit establishing near field wireless communication with a printer, a print instruction to print the specific contents data corresponding to the one or more images selected by the selecting operation, based on the acquired image selection data.

BRIEF DESCRIPTION OF THE ACCOMPANYING DRAWINGS

FIG. 1 is a block diagram of a communication system in an embodiment according to one or more aspects of the present invention.

FIGS. 2 to 4 exemplify display modes in which images are displayed on a panel of a mobile phone in the embodiment according to one or more aspects of the present invention.

Figure 10:
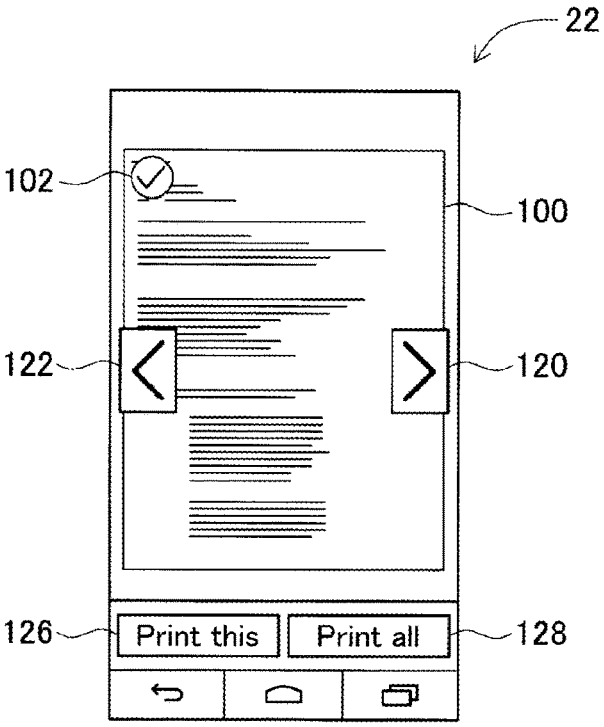

FIG. 10 exemplifies a display mode in which a single image is displayed on the panel of the mobile phone in a modification where a plurality of images are displayed on an image-by-image basis in accordance with one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompanying drawings.

<Configuration of Communication System>

Figure 1:
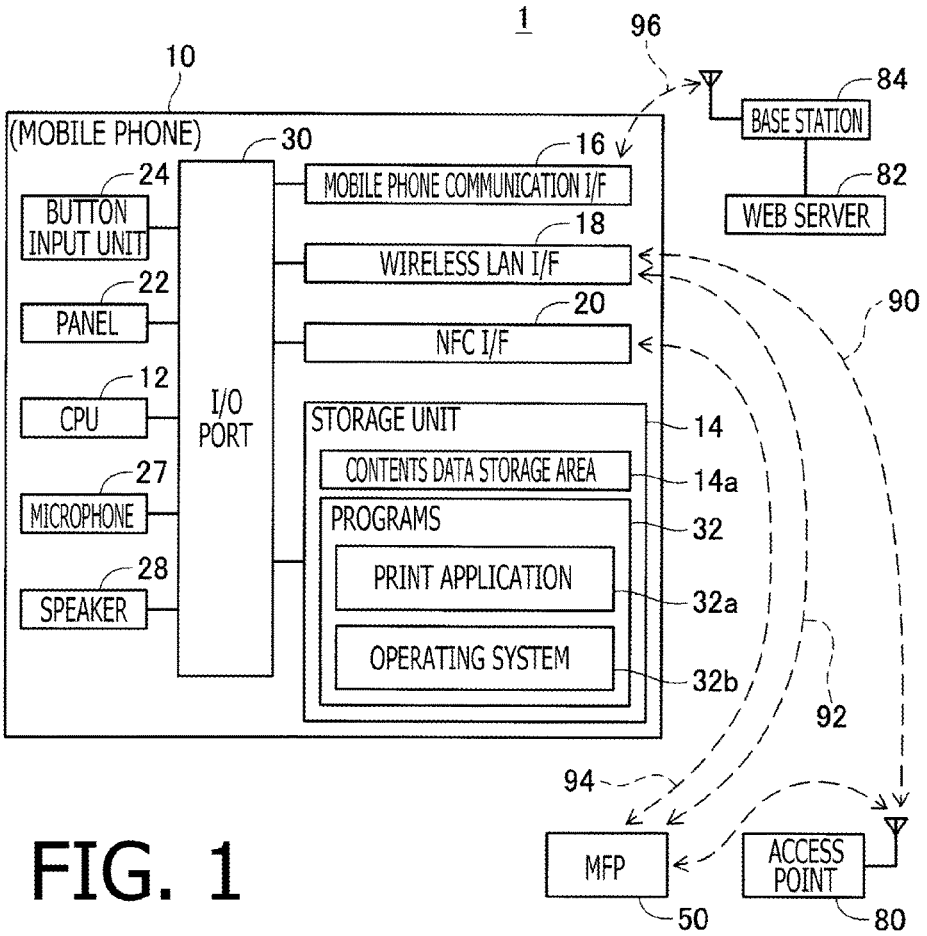

As shown in FIG. 1, a communication system 1 of the embodiment includes a mobile phone 10, a multi-function peripheral (hereinafter, which may be referred to as MFP) 50, an access point 80, a web server 82, and a base station 84. Each of the mobile phone 10 and the MFP 50 is configured to serve as a wireless LAN terminal device. Further, the MFP 50 is configured to have a plurality of functions such as a printing function, a scanning function, a copy function, and a facsimile function. The access point 80 is configured to serve as a wireless LAN access point. The web server 82 is configured to provide a client device via a network with a function and data owned by the web server 82.

A configuration of the mobile phone 10 will be described. The mobile phone 10 includes a central processing unit (hereinafter, which may be referred to as CPU) 12, a storage unit 14, a mobile phone communication interface (hereinafter, which may be referred to as "I/F") 16, a wireless LAN interface (I/F) 18, an NFC interface (I/F) 20, a panel 22, a button input unit 24, a microphone 27, and a speaker 28. These elements 12, 14, 16, 18, 20, 22, 24, 27, and 28 are configured to communicate with each other via an input-output port 30.

The wireless LAN I/F 18 is configured to perform Wi-Fi (hereinafter, which may be referred to as WF) wireless communication 90 based on a communication standard IEEE 802.11 or an equivalent standard. Namely, the mobile phone 10 is configured to perform data communication with the MFP 50 via the access point 80 when accessing the access point 80 so as to be allowed to perform the WF wireless communication 90.

Further, the wireless LAN I/F 18 is configured to perform Wi-Fi Direct (hereinafter, which may be referred to as WFD) wireless communication 92 based on the communication standard IEEE 802.11 or an equivalent standard. Namely, the mobile phone 10 is configured to perform direct data communication with the MFP 50 when accessing an access point of the MFP 50 so as to be allowed to perform the WFD wireless communication 92.

The NFC I/F 20 is configured to perform NFC wireless communication 94 based on international standards of ISO/IEC21481 or ISO/IEC18092. Namely, the mobile phone 10 is configured to perform direct data communication with the MFP 50 when put into a state of the NFC wireless communication 94 being available. In this respect, nonetheless, the NFC wireless communication 94 has a shorter communicable distance and a lower communication speed than the WF wireless communication 90 and the WFD wireless communication 92.

The mobile phone communication I/F 16 is configured to perform mobile phone wireless communication 96 with the base station 84. Namely, the mobile phone 10 is configured to perform data communication with the web server 82 via the base station 84 when put into a state of the mobile phone wireless communication 96 being available.

The CPU 12 is configured to carry out processes in accordance with programs 32 stored in the storage unit 14. Hereinafter, the CPU 12 executing a program (such as a print application 32a) may be simply referred to as a program name of the program. For instance, "the print application 32a" may represent "the CPU 12 that executes the print application 32a." It is noted that the storage unit 14 may include a combination of a random access memory (hereinafter, which may be referred to as RAM), a read only memory (hereinafter, which may be referred to as ROM), a flash memory, a hard disk drive (hereinafter, which may be referred to as HDD), and a buffer of the CPU 12.

The storage unit 14 is configured to store the programs 32, which contain the print application 32a and an operating system (hereinafter, which may be referred to as OS) 32b. The print application 32a is configured to cause the CPU 12 to carry out a process for controlling the MFP 50 to print images expressed by contents data stored in a contents data storage area 14a.

The OS 32b is a program configured to provide a basic function to be used by the print application 32a. The OS 32b contains programs for performing the wireless communications 90, 92, 94, and 96 via the wireless LAN I/F 18, the NFC I/F 20, and the mobile phone communication I/F 16, and programs for controlling the storage unit 14, the panel 22, and the button input unit 24.

Further, the storage unit 14 includes the contents data storage area 14a, which is configured to store a plurality of pieces of photograph data (e.g., JPEG data) and document data (e.g., PDF data). In addition, the document data generally contains a plurality of pieces of page document data corresponding to a plurality of pages. The print application 32a is configured to acquire data from the storage unit 14 via the OS 32b. Moreover, the print application 32a is configured to output and store data into the storage unit 14 via the OS 32b.

The panel 22 includes a display screen configured to display various functions of the mobile phone 10. The print application 32a is configured to output image data and cause the panel 22 to display an image based on the image data via the OS 32b. The button input unit 24 includes a touch sensor, and is integrated with the panel 22. Thus, the button input unit 24 is configured to detect an input medium close to or in contact with the panel 22, and accept a user's button operation. The print application 32a is configured to acquire, via the OS 32b, data indicating what button operation has been performed by the user.

<Operations of Mobile Phone>

An explanation will be provided about operations of the mobile phone 10 in the embodiment. The mobile phone 10 is configured to cause the MFP 50 to print one or more images corresponding to the contents data stored in the contents data storage area 14a, in response to the mobile phone 10 being brought close to the MFP 50.

Figure 2:
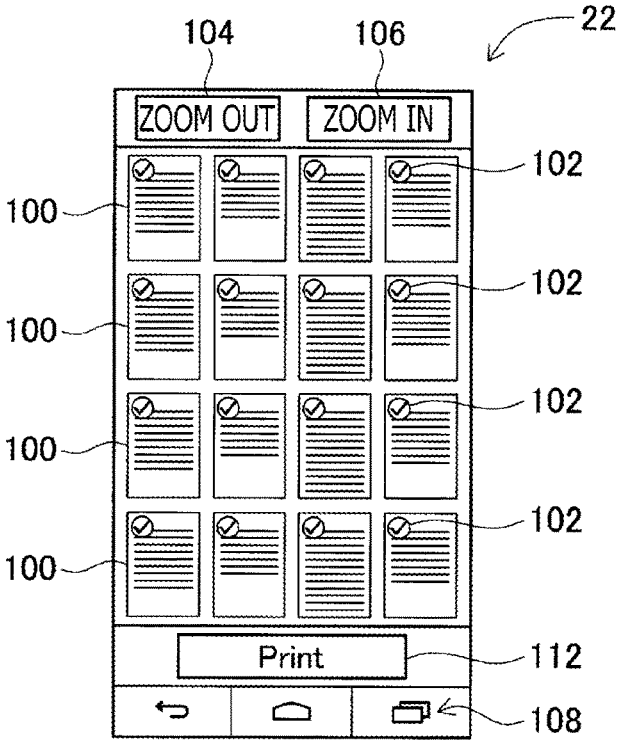

Specifically, as shown in FIG. 2, the mobile phone 10 displays, on the panel 22, images 100 based on contents data stored in the contents data storage area 14a in thumbnail form. The contents data storage area 14a stores JPEG photograph data and PDF document data. The mobile phone 10 is configured to display photograph images based on the JPEG photograph data.

Meanwhile, the mobile phone 10 is not allowed to display on the panel 22 document images based on the PDF document data. Therefore, the PDF document data in the mobile phone 10 is transmitted to the web server 82 via the wireless communication 96, and each piece of page document data of the PDF document data is converted by the web server 82 into JPEG page document data. Namely, the PDF document data is converted into a plurality of pieces of JPEG page document data. Then, the JPEG page document data converted is returned to the mobile phone 10 via the wireless communication 96, and document images are displayed on the panel 22 based on the JPEG page document data.

Each of the images 100 displayed on the panel 22 is provided with a confirmation box 102. The confirmation box 102 is configured to indicate whether a corresponding image 100 is selected by the user. When a user applies a tapping operation onto the image 100, a check mark "v" is placed in the confirmation box 102. Each image 100 with the check mark "v" placed in the confirmation box 102 thereof is an image selected by the user. Further, by a user's tapping operation of an image 100 with the check mark "v" placed in the confirmation box 102 thereof, the check mark "v" is removed from the confirmation box 102. Thereby, the user's selection of the image 100 is canceled. Namely, the user is allowed to select and deselect an intended one of the images 100 displayed on the panel 22. It is noted that the tapping operation may be an operation for bringing an input medium (e.g., a user's finger) close to or into contact with the panel 22.

Figure 3:
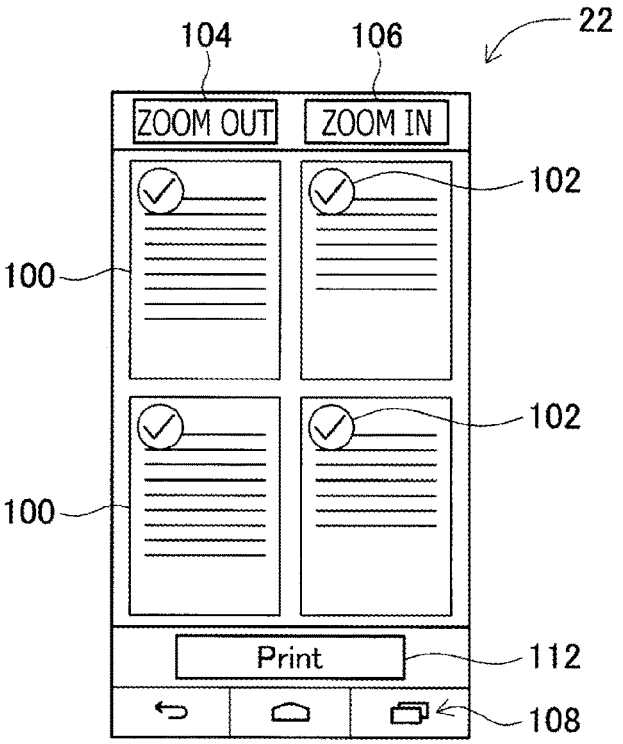

On the panel 22, a zoom-out button 104 and a zoom-in button 106 are displayed above the images 100. The zoom-out button 104 is configured to, when operated, reduce the size of the images 100. The zoom-in button 106 is configured to, when operated, enlarge the size of the images 100. For example, when the zoom-in button 106 is operated, the images 100 displayed on the panel 22 are scaled up as shown in FIG. 3. Thereby, the user is allowed to confirm details of the images 100 and easily make image selection. Meanwhile, when the zoom-out button 104 is operated, the images 100 displayed on the panel 22 are scaled down as shown in FIG. 2. Thereby, the user is allowed to inspect a larger number of images 100 at a time.

Figure 4:
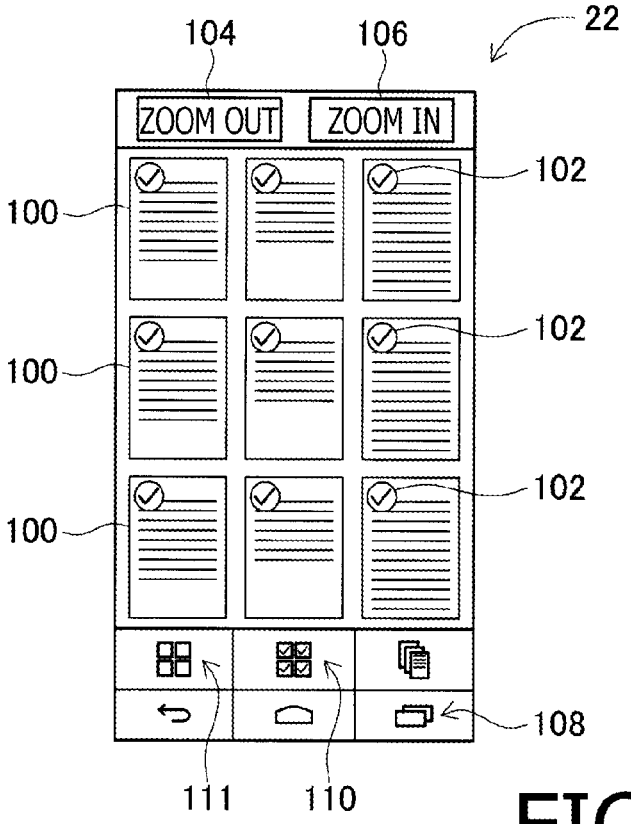

Further, the mobile phone 10 is configured to collectively select all the images 100 displayed on the panel 22. Specifically, there is a menu button 108 displayed in a lower area of the panel 22. When the menu button 108 is operated, an all-image selecting button 110 is displayed in the lower area of the panel 22, as shown in FIG. 4. When the all-image selecting button 110 is operated, the check mark "v" is placed in the confirmation box 102 of every image 100 displayed on the panel 22. Namely, all the images 100 displayed on the panel 22 are collectively selected. Further, on the panel 22, an image selection cancelling button 111 is displayed. When the image selection canceling button 111 is operated, the check mark "v" is deleted from the confirmation box 102 of every selected image 100 displayed on the panel 22. Namely, all the images 100 displayed on the panel 22 are collectively deselected.

When the user selects one or more images from the images 100 displayed on the panel 22, the mobile phone 10 stores information that specifies the one or more images 100 selected by the user. When the mobile phone 10 is brought close to the MFP 50 so as to be placed within a communicable distance of the NFC wireless communication 94 from the MFP 50, the NFC wireless communication 94 is established between the mobile phone 10 and the MFP 50.

When the NFC wireless communication 94 is established, connection information for establishing the WF wireless communication 90 or WFD wireless communication 92 is transmitted between the mobile phone 10 and the MFP 50. This is because the WF wireless communication 90 and the WFD wireless communication 92 are allowed to achieve higher-speed data communication than the NFC wireless communication 94, and it is preferable that the document data or the photograph data is transmitted via the WF wireless communication 90 or the WFD wireless communication 92.

As an example of the connection information for establishing the WF wireless communication 90 or the WFD wireless communication 92, cited is a service set identifier (SSID) to be transmitted between the mobile phone 10 and the MFP 50. Specifically, when the NFC wireless communication 94 is established, initially, an SSID to be used by the wireless LAN I/F 18 of the mobile phone 10 is transmitted from the mobile phone 10 to the MFP 50 via the NFC wireless communication 94.

Then, when the SSID from the mobile phone 10 is identical to an SSID to be used by the MFP 50, it represents that the WF wireless communication 90 or the WFD wireless communication 92 is established between the mobile phone 10 and the MFP 50. In this case, a message, informing that the WF wireless communication 90 or the WFD wireless communication 92 is established, is transmitted from the MFP 50 to the mobile phone 10.

Meanwhile, when the SSID from the mobile phone 10 is not identical to the SSID to be used by the MFP 50, an SSID for accessing the access point of the MFP 50 and establishing the WFD wireless communication 92 is transmitted from the MFP 50 to the mobile phone 10 via the NFC wireless communication 94. Then, the mobile phone 10 establishes the WFD wireless communication 92 with the MFP 50 based on the SSID received from the MFP 50.

When the WFD wireless communication 92 or the WF wireless communication 90 is established between the mobile phone 10 and the MFP 50, the mobile phone 10 transmits to the MFP 50 the page document data or the photograph data of the images 100 selected by the user, based on the information that specifies the images 100 selected by the user. At this time, a print instruction to print the selected images 100 is transmitted from the mobile phone 10 to the MFP 50, together with the page document data or the photograph data of the selected images 100. Thereby, the MFP 50 performs the printing operation of printing the selected images 100 based on the page document data or the photograph data received from the mobile phone 10.

Thus, by selecting one or more images from the images 100 displayed on the panel 22 and bringing the mobile phone 10 close to the MFP 50, the user of the mobile phone 10 is allowed to cause the MFP 50 to print the selected images 100. Namely, it is possible to improve user-friendliness of the mobile phone 10, which allows the user to cause the MFP 50 to print the selected images 100 without a user's operation such as an operation to issue a print instruction at the side of the mobile phone 10.

When the MFP 50 is configured to print PDF document data, it is possible to transmit, to the MFP 50, the contents data itself (i.e., the PDF document data) and information that specifies pages corresponding to the images selected by the user. Furthermore, when the MFP 50 is configured to print data of a different format, it is possible to convert the contents data into data of the different format, and transmit the converted data to the MFP 50.

Further, even though the mobile phone 10 is separated from the MFP 50 after brought close to the MFP 50, the mobile phone 10 stores the information that specifies the images selected by the user. Therefore, when bringing the mobile phone 10 close to the MFP 50 again, the user is allowed to cause the MFP 50 to print the images based on the page document data or the photograph data used in a previous printing operation, without having to select the images again. Namely, by repeating the operations to bring the mobile phone 10 close to the MFP 50 and separate the mobile phone 10 from the MFP 50, the user is allowed to repeatedly print the same images.

Further, when there is a single piece of photograph data to be displayed on the panel 22, or there is a single piece of page document data to be displayed on the panel 22, a single image 100 is displayed on the panel 22. In this case, even though the single image 100 is not selected by the user, the page document data or the photograph data of the single image 100 is transmitted together with the print instruction, to the MFP 50 via the WF wireless communication 90 or the WFD wireless communication 92, after the mobile phone 10 is brought close to the MFP 50 so as to establish the NFC wireless communication 94. Thereby, when the single image 100 is displayed on the panel 22, the user is allowed to print the single image 100 without having to select the single image 100. Thus, it is possible to achieve the mobile phone 10 (the communication system 1) having user-friendliness improved.

Further, the printing operation of printing the selected images 100 may be performed in a method different from the aforementioned method. Specifically, as shown in FIG. 2, there is a print button 112 displayed in the lower area of the panel 22. In addition, in the storage unit 14, default settings are previously set and registered, which contain information on a printer previously set as a default printer, and an SSID for establishing the WFD wireless communication 92 or the WF wireless communication 90 with the previously-set printer. Therefore, when the print button 112 is operated, the mobile phone 10 causes the previously-set printer to print the selected images 100. Namely, when the user selects one or more images 100 of the images displayed on the panel 22, and thereafter operates the print button 112, a print instruction is transmitted together with the page document data or the photograph data, to the previously-set printer via the WFD wireless communication 92 or the WF wireless communication 90. Then, the printer, which has received the print instruction with the page document data or the photograph data, prints images based on the page document data or the photograph data. Thereby, for instance, the user is allowed to cause the MFP 50 near the user to perform the printing operation by bringing the mobile phone 10 close to the MFP 50, and the user is also allowed to cause the default printer previously set for ordinary use to perform the printing operation. Thus, it is possible to achieve the mobile phone 10 (the communication system 1) having user-friendliness improved.

Further, for instance, in the case where the previously-set default printer is not the MFP 50, when the NFC wireless communication 92 is established between the mobile phone 10 and the MFP 50, the mobile phone 10 sets the MFP 50 as the default printer that performs the printing operation in response to the print button 112 being operated. Namely, the mobile phone 10 is configured to set the most recently used printer as the default printer that performs the printing operation in response to the print button 112 being operated. Thereby, by operating print button 112, it is possible to again perform the printing operation using the most recently used printer.

<Print Application>

The aforementioned printing operation is performed when the print application 32a is executed by the CPU 12. Hereinafter, referring to FIGS. 5 to 8, an explanation will be provided about a procedure to cause the MFP 50 to print images based on the contents data stored in the mobile phone 10.

Figure 5:
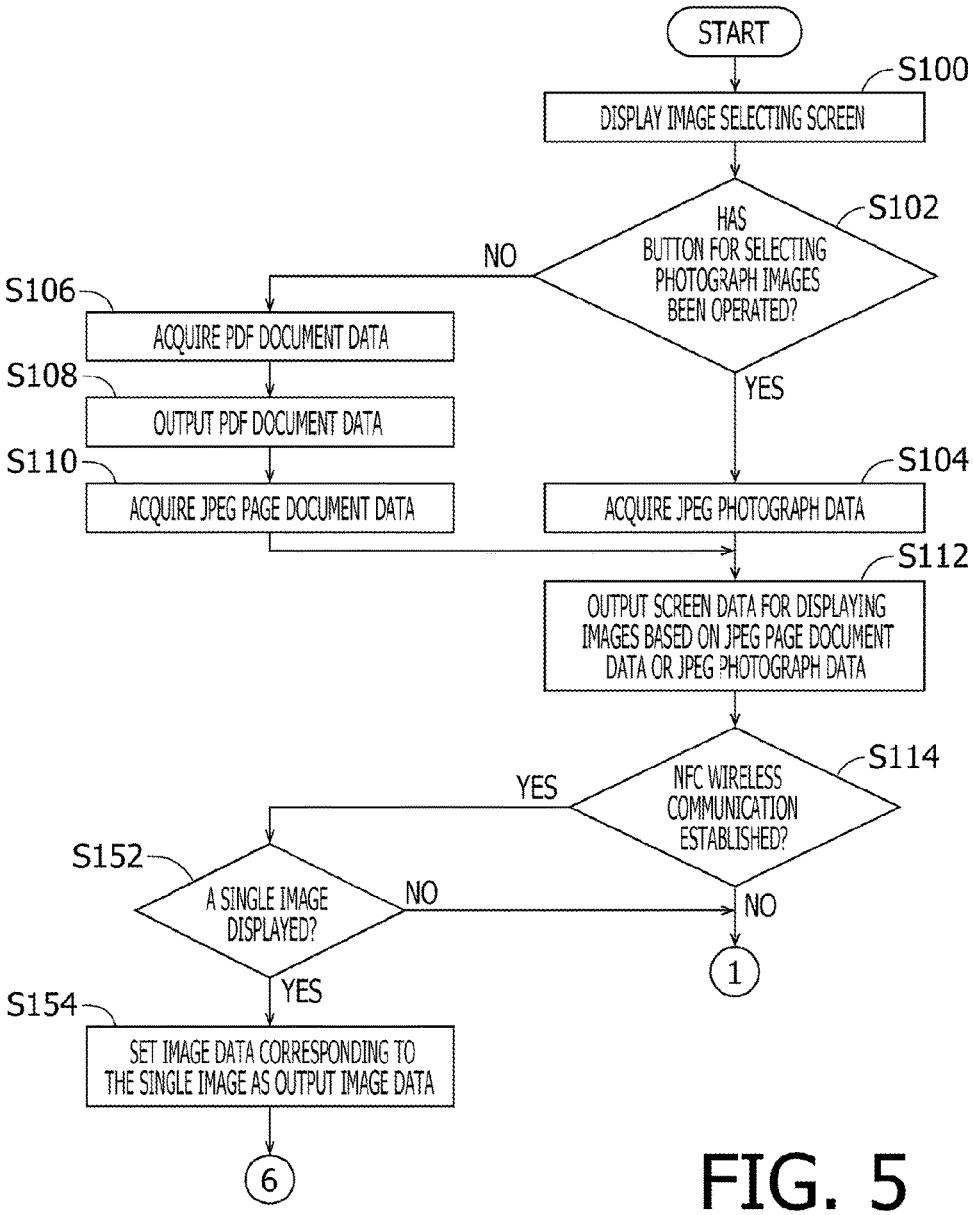
FIGS. 5 to 8 are flowcharts showing a procedure of a process to be executed by the mobile phone to cause a multi-function peripheral (hereinafter, which may be referred to as MFP) to print images based on contents data stored in the mobile phone in the embodiment according to one or more aspects of the present invention.
Figure 6:
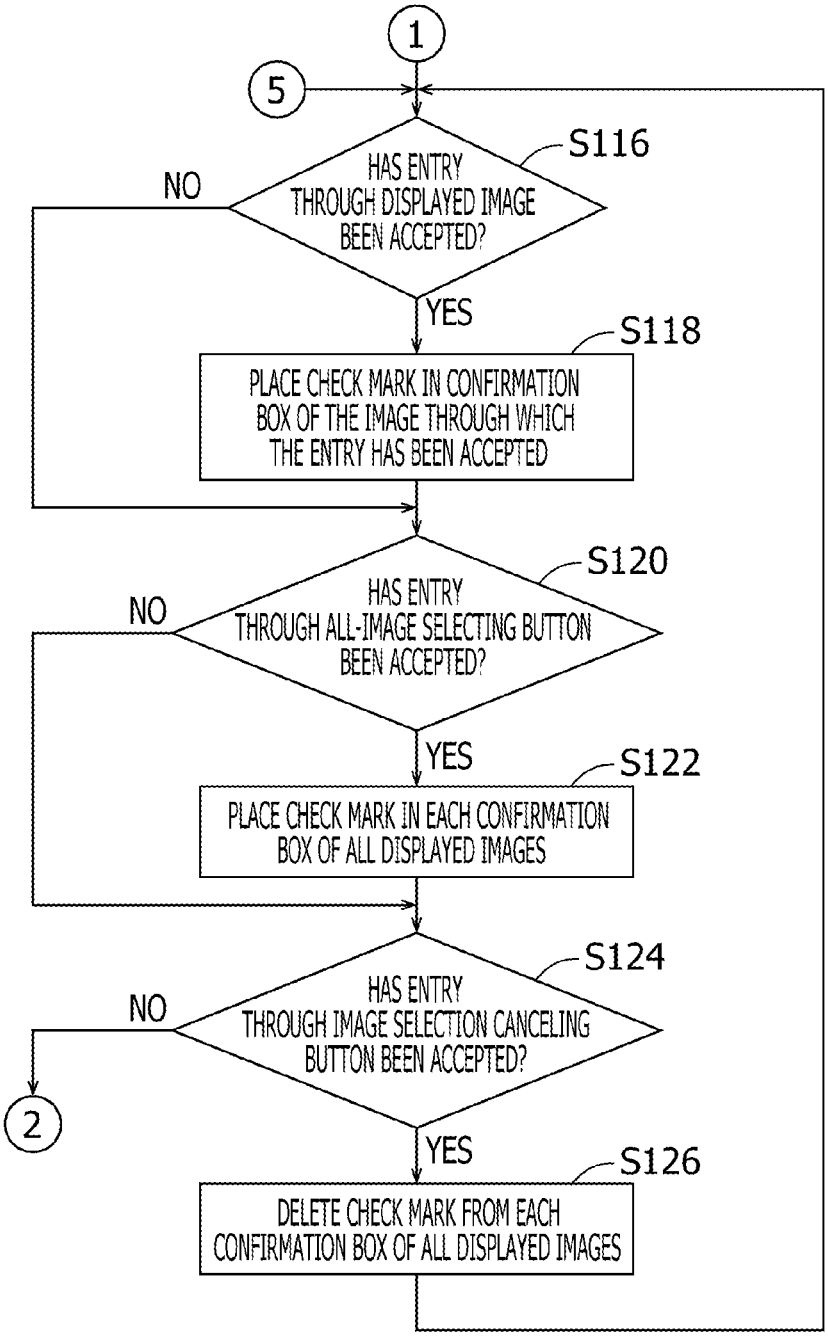
Figure 7:
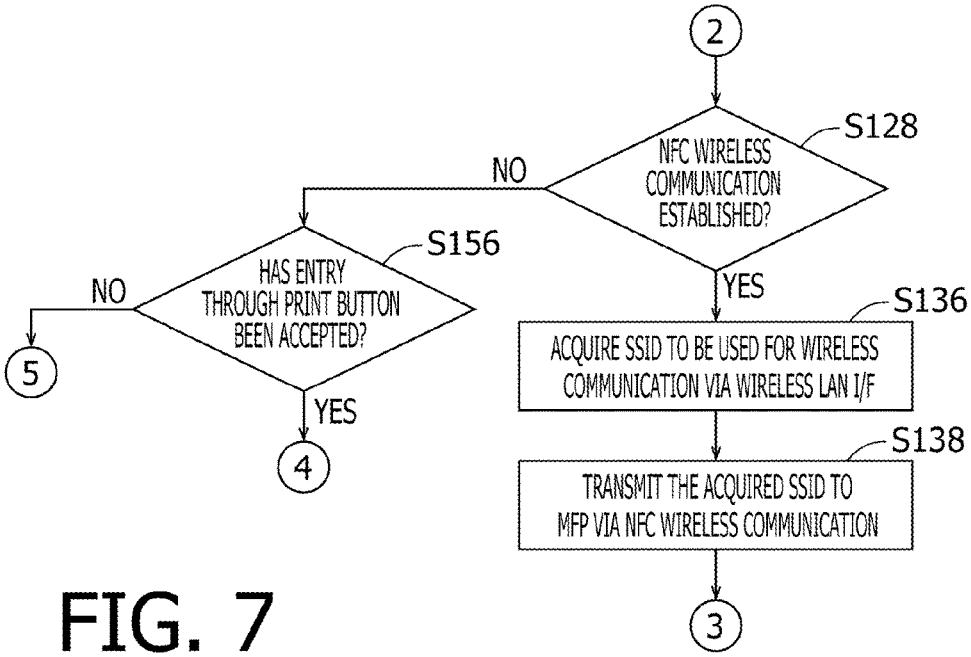
Figure 8:
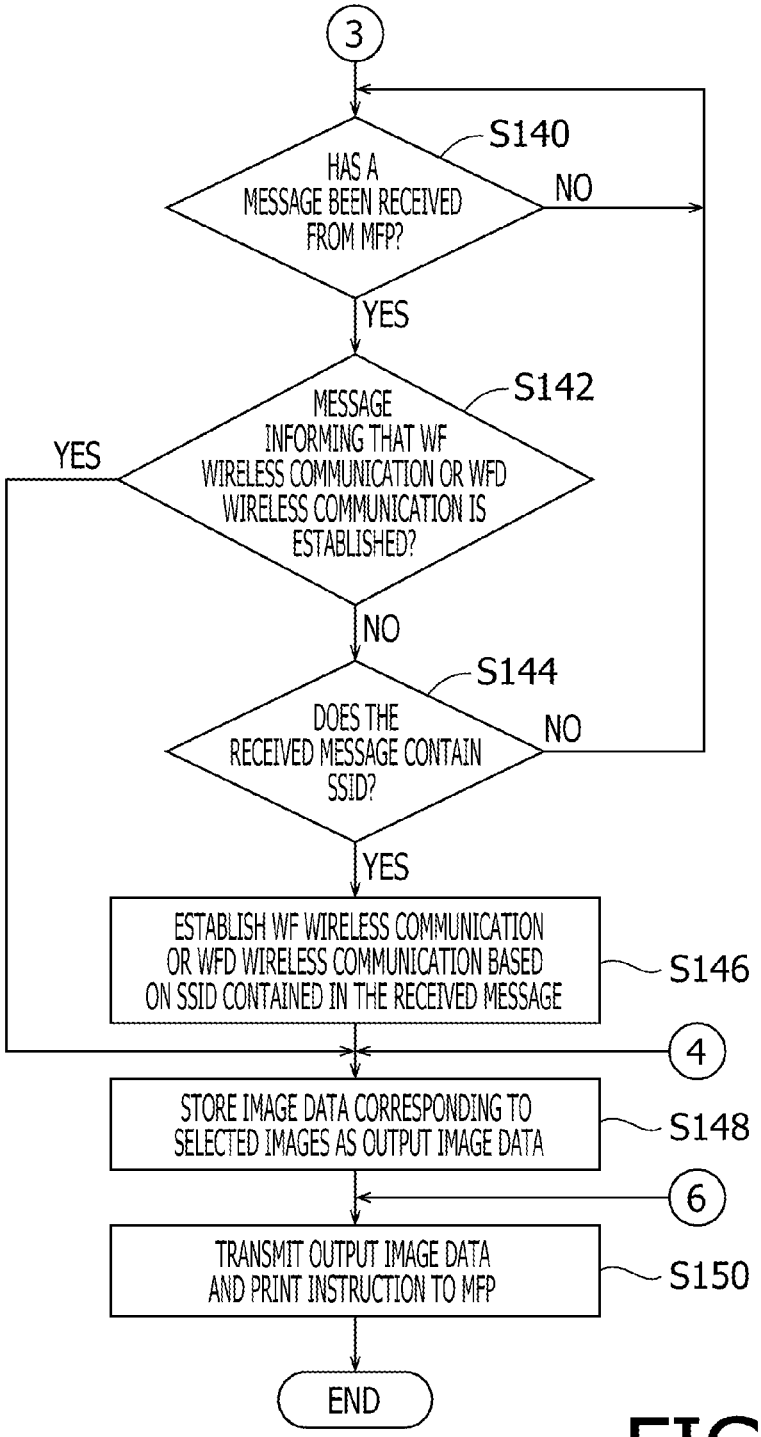

Firstly, in S100 of a main flow shown in FIG. 5, the CPU 12 outputs screen data for controlling the panel 22 to display thereon an image selecting screen on the panel 22 via the OS 32b. The image selecting screen is a screen for making a selection as to which to display on the panel 22 between the photograph images and the document images, and includes two buttons displayed thereon, i.e., a button for selecting photograph images and a button for selecting document images. Then, the CPU 12 goes to S102.

In S102, the CPU 12 determines whether the mobile phone 10 (the CPU 12) has accepted an entry through the button for selecting photograph images, that is, whether the mobile phone 10 (the CPU 12) has acquired, via the OS 32b, data generated in response to an operation of the button for selecting photograph images. When determining that the mobile phone 10 (the CPU 12) has accepted an entry through the button for selecting photograph images (S102: Yes), the CPU 12 goes to S104. In S104, the CPU 12 acquires, via the OS 32b, the JPEG photograph data stored in the storage unit 14. Then, the CPU 12 goes to S112.

Meanwhile, when determining that the mobile phone 10 (the CPU 12) has accepted an entry through the button for selecting document images (S102: No), the CPU 12 goes to S106. In S106, the CPU 12 acquires, via the OS 32b, the PDF document data stored in the storage unit 14. Then, the CPU 12 goes to S108, in which the CPU 12 outputs the PDF document data so as to cause the mobile phone communication I/F 16 to transmit the PDF document data to the web server 82 via the mobile phone wireless communication 96. In other words, the CPU 12 controls the mobile phone communication I/F 16 to transmit the PDF document data to the web server 82 via the mobile phone wireless communication 96. Then, the CPU 12 goes to S110, in which the CPU 12 acquires the JPEG page document data received by the mobile phone communication I/F 16 via the mobile phone wireless communication 96. The JPEG page document data is data into which the PDF document data has been converted by the web server 82. Then, the CPU 12 goes to S112.

In S112, the CPU 12 outputs screen data for controlling the panel 22 to display thereon the images 100 in thumbnail form based on the JPEG page document data or the JPEG photograph data. The screen data contains data path information for allowing the OS 32b to acquire the page document data or the photograph data, and layout information for showing locations, on the screen, of various elements (such as the images 100 based on the page document data or the photograph data, the zoom-out button 104, and the zoom-in button 106). Then, the CPU 12 goes to S114, in which the CPU 12 determines whether the NFC wireless communication 94 is established. When determining that the NFC wireless communication 94 is not established (S114: No), the CPU 12 goes to S116.

In S116, the CPU 12 determines whether the mobile phone 10 (the CPU 12) has accepted an entry through an image 100 displayed on the panel 22, i.e., whether the mobile phone 10 (the CPU 12) has acquired, via the OS 32b, data generated in response to an operation of an image 100. When determining that the mobile phone 10 (the CPU 12) has accepted an entry through an image 100 displayed on the panel 22 (S116: Yes), the CPU 12 goes to S118. In S118, the CPU 12 outputs data for placing the check mark "v" in the confirmation box 102 of the image 100 through which the entry has been accepted via the OS 32b. Then, the CPU 12 goes to S120. Meanwhile, when determining that the mobile phone 10 (the CPU 12) has not accepted an entry through an image 100 displayed on the panel 22 (S116: No), the CPU 12 goes to S120.

In S120, the CPU 12 determines whether the mobile phone 10 (the CPU 12) has accepted an entry through the all-image selecting button 110, i.e., whether the mobile phone 10 (the CPU 12) has acquired, via the OS 32b, data generated in response to an operation of the all-image selecting button 110. When determining that the mobile phone 10 (the CPU 12) has accepted an entry through the all-image selecting button 110 (S120: Yes), the CPU 12 goes to S122. In S122, the CPU 12 outputs data for placing the check mark "v" in each confirmation box 102 of all the displayed images 100 via the OS 32b. Then, the CPU 12 goes to S124. Meanwhile, when determining that the mobile phone 10 (the CPU 12) has not accepted an entry through the all-image selecting button 110 (S120: No), the CPU 12 goes to S124.

In S124, the CPU 12 determines whether the mobile phone 10 (the CPU 12) has accepted an entry through the image selection canceling button 111, i.e., whether the mobile phone 10 (the CPU 12) has acquired, via the OS 32b, data generated in response to an operation of the image selection canceling button 111. When determining that the mobile phone 10 (the CPU 12) has accepted an entry through the image selection canceling button 111 (S124: Yes), the CPU 12 goes to S126. In S126, the CPU 12 outputs data for deleting the check mark "v" from each confirmation box 102 of all the displayed images 100 via the OS 32b. Then, the CPU 12 goes back to S116. Meanwhile, when determining that the mobile phone 10 (the CPU 12) has not accepted an entry through the image selection canceling button 111 (S124: No), the CPU 12 goes to S128.

In S128, the CPU 12 determines whether the NFC wireless communication 94 is established. When determining that the NFC wireless communication 94 is established (S128: Yes), the CPU 12 goes to S136. In S136, the CPU 12 acquires an SSID configured to be used for wireless communication via the wireless LAN I/F 18. Then, the CPU 12 goes to S138, in which the CPU 12 outputs the acquired SSID so as to cause the NFC I/F 20 to transmit the SSID to the MFP 50 via the NFC wireless communication 94. In other words, the CPU 12 controls the NFC I/F 20 to transmit the acquired SSID to the MFP 50 via the NFC wireless communication 94. Then, the CPU 12 goes to S140.

In S140, the CPU 12 determines whether the mobile phone 10 (the CPU 12) has received a message from the MFP 50, i.e., whether the mobile phone 10 (the CPU 12) has acquired, via the OS 32b, data generated in response to receipt of a message. When determining that the mobile phone 10 (the CPU 12) has received a message from the MFP 50 (S140: Yes), the CPU 12 goes to S142. In S142, the CPU 12 determines whether the mobile phone 10 (the CPU 12) has received a message informing that the WF wireless communication 90 or the WFD wireless communication 92 is established, i.e., whether the mobile phone 10 (the CPU 12) has acquired, via the OS 32b, data generated in response to receipt of a message informing that the WF wireless communication 90 or the WFD wireless communication 92 is established. When determining that the mobile phone 10 (the CPU 12) has not received a message informing that the WF wireless communication 90 or the WFD wireless communication 92 is established (S142: No), the CPU 12 goes to S144.

In S144, the CPU 12 determines whether the received message contains an SSID. When determining that the received message does not contain an SSID (S144: No), the CPU 12 goes back to S140. Meanwhile, when determining that the received message contains an SSID (S144: Yes), the CPU 12 goes to S146. In S146, the CPU 12 accesses the access point of the MFP 50 based on the SSID contained in the received message, and establishes the WFD wireless communication 92. Then, the CPU 12 goes to S148. It is noted that the CPU 12 goes to S148 when receiving the message informing that the WF wireless communication 90 or the WFD wireless communication 92 is established (S142: Yes).

In S148, the CPU 12 stores information for identifying, as output image data, the page document data or the photograph data corresponding to each image 100 with the check mark "v" placed in the confirmation box 102 thereof (i.e., each image 100 selected by the user). Then, the CPU 12 goes to S150. It is noted that the output image data includes the page document data or the photograph data to be transmitted to the MFP 50 as object data to be printed. Namely, the photograph data, identified as the output image data, is contents data corresponding to the image(s) 100 selected by the user. Further, the page document data, identified as the output image data, is data generated from the contents data corresponding to the image(s) 100 selected by the user. In S150, the CPU 12 outputs the output image data and a print instruction to print the image(s) 100 based on the output image data, so as to cause the wireless LAN I/F 18 to transmit the output image data and the print instruction to the MFP 50 via the WF wireless communication 90 or the WFD wireless communication 92. In other words, the CPU 12 controls the wireless LAN I/F 18 to transmit the output image data and the print instruction to print the image(s) 100 based on the output image data, to the MFP 50 via the WF wireless communication 90 or the WFD wireless communication 92. Thereby, the MFP 50 performs the printing operation based on the contents data corresponding to the image(s) selected by the user.

Further, when determining that the NFC wireless communication 94 is established (S114: Yes), the CPU 12 goes to S152. In S152, the CPU 12 determines whether a single image 100 is displayed on the panel 22 (e.g., whether only a single image 100 is displayed on the panel 22 based on a single piece of photograph data, or based on the document data containing a single piece of page document data). When determining that two or more images 100 are displayed on the panel 22 (S152: No), the CPU 12 goes to S116 and executes the aforementioned operation in the step.

Meanwhile, when determining that a single image 100 is displayed on the panel 22 (S152: Yes), the CPU 12 goes to S154. In S154, the CPU 12 stores information for identifying, as the output image data, the page document data or the photograph data corresponding to the single image 100 displayed on the panel 22. Then, the CPU 12 goes to S150, and executes the aforementioned operation in the step.

Further, when determining that the NFC wireless communication 94 is not established (S128: No), the CPU 12 goes to S156. In S156, the CPU 12 determines whether the mobile phone 10 (the CPU 12) has accepted an entry through the print button 112, i.e., whether the mobile phone 10 (the CPU 12) has acquired, via the OS 32b, data generated in response to an operation of the print button 112. When determining that the mobile phone 10 (the CPU 12) has not accepted an entry through the print button 112 (S156: No), the CPU 12 goes back to S116.

Meanwhile, when determining that the mobile phone 10 (the CPU 12) has accepted an entry through the print button 112 (S156: Yes), the CPU 12 goes to S148, and executes the aforementioned operation in the step.

Figure 9:
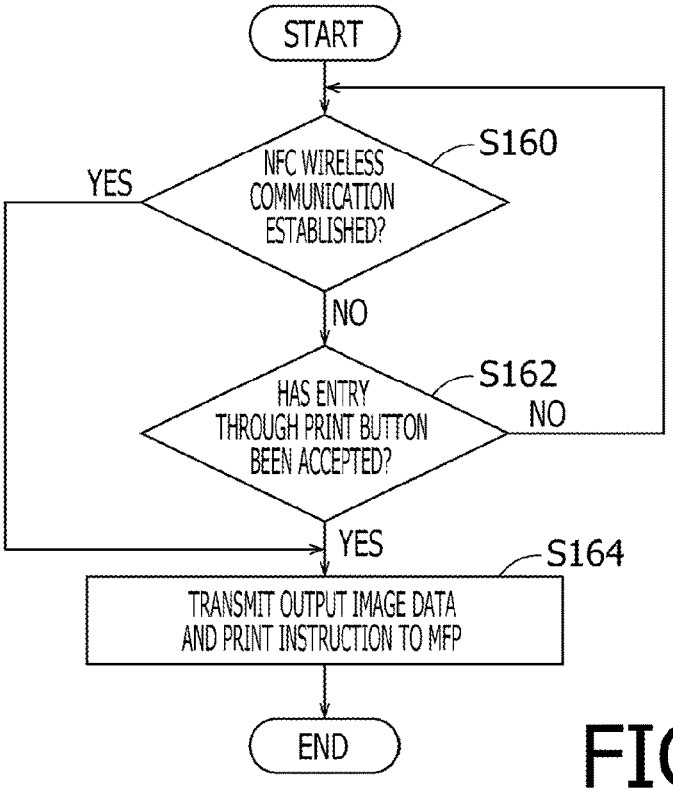
FIG. 9 is a flowchart showing a procedure of a process executable by the mobile phone after the process shown in FIGS. 5 to 8 in the embodiment according to one or more aspects of the present invention.

By the above process, the MFP 50 is caused to print the selected images 100 based on the contents data stored in the mobile phone 10. Further, after the printing operation is performed in accordance with the above process, a process shown in FIG. 9 may be performed.

Specifically, in S160, the CPU 12 determines whether the NFC wireless communication 94 is established. When determining that the NFC wireless communication 94 is not established (S160: No), the CPU 12 goes to S162. In S162, the CPU 12 determines whether the mobile phone 10 (the CPU 12) has accepted an entry through the print button 112, i.e., whether the mobile phone 10 (the CPU 12) has acquired, via the OS 32b, data generated in response to an operation of the print button 112. When determining that the mobile phone 10 (the CPU 12) has not accepted an entry through the print button 112 (S162: No), the CPU 12 goes back to S160.

Meanwhile, when determining that the mobile phone 10 (the CPU 12) has accepted an entry through the print button 112 (S162: Yes), the CPU 12 goes to S164. In S164, the CPU 12 outputs the stored output image data and a print instruction to print the image(s) 100 based on the output image data, so as to cause the wireless LAN I/F 18 to transmit the output image data and the print instruction to the MFP 50 via the WF wireless communication 90 or the WFD wireless communication 92. In other words, the CPU 12 controls the wireless LAN I/F 18 to transmit the stored output image data and the print instruction to print the image(s) 100 based on the output image data, to the MFP 50 via the WF wireless communication 90 or the WFD wireless communication 92.

Further, when determining that the NFC wireless communication 94 is established (S160: Yes), the CPU 12 goes to S164 and executes the aforementioned operation in the step. Thus, after the printing operation, when the mobile phone 10 is brought close to the MFP 50, or the print button 112 is operated, a printing operation is performed to print the image(s) 100 based on the output image data, i.e., the image(s) 100 printed most recently. It is noted that, when a user operation is performed to execute S100 of the main flow shown in FIG. 5, all the information identified as the output image data is deleted.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiment will be omitted.

[Modifications]

In the aforementioned embodiment, as shown in FIG. 2, a plurality of images 100 are displayed on the panel 22 in thumbnail form. However, a plurality of images 100 may be displayed on the panel 22 on an image-by-image basis. Specifically, as shown in FIG. 10, one image 100 of a plurality of images 100 may be displayed on the panel 22, and the displayed image 100 may be changed from one image to another in response to an operation of a forward button 120 or a back button 122 displayed on the panel 22.

Further, each image 100 displayed on an image-by-image basis may be provided with the confirmation box 102, and a check mark "v" may be placed in or removed from the confirmation box 102 in a switchable manner in response to each tapping operation of the image 100. Namely, even when a plurality of images 100 are displayed on an image-by-image basis, the selection state of the displayed image 100 may be switched by a tapping operation of the image 100 between a selected state and a non-selected state.

Further, under the image 100 displayed (on an image-by-image basis), two types of buttons 126 and 128 may be displayed. The print button 126 may be a button for printing the image 100 displayed on the panel 22. Namely, when the print button 126 is operated, the page document data or the photograph data of the image 100 displayed on the panel 22, and a print instruction to print the image 100 may be transmitted to the default printer. Thereby, the image 100 displayed on the panel 22 may be printed by the default printer.

Meanwhile, the print button 128 may be a button for printing all the images 100 displayable on the panel 22 in response to an operation of the forward button 120 or the back button 122, as well as the image 100 currently displayed on the panel 22. Namely, the print button 128 may be a button for printing all the selectable images 100. Specifically, when the print button 128 is operated, the page document data or the photograph data of every selectable image 100, and a print instruction to print all the selectable images 100 may be transmitted to the default printer. Thereby, all the selectable images 100 may be printed by the default printer.

In the aforementioned embodiment, the MFP 50 has the wireless LAN access point. However, aspects of the present invention may be applied to a printer having no wireless LAN access point. When aspects of the present invention are applied to a printer having no wireless LAN access point, the "SSID" referred to in the determination in S144 (as to whether the received message contains an SSID) is an SSID for establishing WF wireless communication with the printer. For example, when the printer is allowed to access the access point 80, the "SSID" referred to in the determination in S144 (as to whether the received message contains an SSID) is an SSID for accessing the access point 80 and establishing the WF wireless communication 90.

In the aforementioned embodiment, the mobile phone 10 is not configured to display on the panel 22 a document image based on PDF document data. However, aspects of the present invention may be applied to a mobile phone configured to display on a display unit a document image based on PDF document data.

In the aforementioned embodiment, the mobile phone 10 is configured to reduce the size of the images 100 displayed on the panel 22 in response to an operation of the zoom-out button 104, and to enlarge the size of the images 100 displayed on the panel 22 in response to an operation of the zoom-in button 106. However, the mobile phone 10 may be configured to reduce the size of the images 100 displayed on the panel 22 in response to a pinching-in operation, and enlarge the size of the images 100 displayed on the panel 22 in response to a pinching-out operation. It is noted that the pinching-in operation may include such an operation that the user moves his/her two fingers closer to each other while keeping the two fingers in contact with or in proximity to the panel 22. The pinching-out operation may include such an operation that the user moves his/her two fingers farther away from each other while keeping the two fingers in contact with or in proximity to the panel 22.

In the aforementioned embodiment, when displaying on the panel 22 images 100 based on JPEG page document data or JPEG photograph data, the mobile phone 10 outputs screen data that contains data path information for accessing the JPEG page document data or the JPEG photograph data or data path information for accessing thumbnail data generated from the JPEG page document data or the JPEG photograph data. However, the screen data may contain the JPEG page document data or the JPEG photograph data, instead of the data path information.

Further, the device configured to issue a print instruction when brought close to the MFP 50 is not limited to the mobile phone 10, but may include a tablet device.

The aforementioned embodiment provides an example where the CPU 12 of the mobile phone 10 is configured to execute various operations based on the print application 32a. However, the CPU 12 of the mobile phone 10 may be configured to issue, based on the print application 32a, instructions to cause other elements (such as the OS 32b, other systems, and hardware elements) to execute various operations.

Each program exemplified in the aforementioned embodiment may include only a single program module, or may include a plurality of program modules. Each individual configuration exemplified in the aforementioned embodiment may be replaced with a replaceable different configuration. Aspects of the present invention may be achieved by, as well as the CPU 12 executing the print application 32a, various configurations such as a computer executing a program (e.g., an operating system, an application, or a program) other than the print application 32a, a hardware element (e.g., the panel 22) operating in accordance with instructions from a computer, a configuration of a computer and a hardware element that operate in collaboration with each other, a computer executing a plurality of programs in collaboration with each other, and a hardware configuration that operates in accordance with instructions from a computer executing a plurality of programs in collaboration with each other.

What is claimed is:

1. A mobile terminal device comprising:

a display unit;

a near field wireless communication unit;

a touch panel; and a storage unit;

a control device configured to:

display a screen on the display unit, the screen including an image for selecting document data stored in the storage unit;

in response to the touch panel accepting a touch operation of touching the image displayed on the display unit for selecting document data, perform:

acquiring the selected document data stored in the storage unit, the selected document data being one of data containing only a single piece of page data and data containing a plurality of pieces of page data;

when the acquired document data contains only a single piece of page data, displaying an image on the display unit based on the single page data;

when the acquired document data contains a plurality of pieces of page data, displaying a plurality of images on the display unit based on the plurality of pieces of page data, respectively; and determining whether the near field wireless communication unit has established near field wireless communication with a printer; and determining whether the acquired document data contains only a single piece of page data or a plurality of pieces of page data;

when determining that the near field wireless communication unit has established the near field wireless communication with the printer and determining that the acquired document data contains only a single piece of page data, transmit a print instruction to print an image that is based on the single piece of page data contained in the acquired document data and displayed on the display unit, to the printer; and when determining that the acquired document data contains a plurality of pieces of page data, in response to the touch panel accepting a touch operation of touching for selecting one or more [of] *images from among* the plurality of images displayed on the display unit based on the plurality of pieces of page data, respectively, perform:

acquiring image selection data for identifying one or more pieces of page data corresponding to the [touched] *selected* one or more [of the plurality of] images, respectively;

determining whether the near field wireless communication unit has established the near field wireless communication with the printer; and in response to determining that the near field wireless communication unit has established the near field wireless communication with the printer and acquiring the image selection data for identifying the one or more pieces of page data corresponding to the [touched] *selected* one or more [of the plurality of] images, respectively, transmitting a print instruction to print [a plurality of] *one or more* images that are based on the one or more pieces of page data identified by the acquired image selection data, respectively, and are based on the one or more pieces of page data corresponding to the [touched] *selected* one or more [of the plurality of] images, respectively to the printer.

2. The mobile terminal device according to claim 1, wherein the control device is further configured to:

output screen data for controlling the display unit to display the plurality of pages generated based on the acquired document data, side by side; and acquire the image selection data in response to the touch panel accepting the touch operation for selecting the one page of the plurality of pages collectively displayed side by side on the display unit.

3. The mobile terminal device according to claim 2, wherein the control device is further configured to output the screen data for controlling the display unit to scale up or down the plurality of pages displayed side by side thereon in response to the touch panel accepting a scaling operation of scaling up or down the plurality of pages displayed side by side on the display unit.

4. The mobile terminal device according to claim 1, wherein the control device is further configured to:

output screen data for controlling the display unit to display the plurality of pages generated based on the acquired document data, on an image-by-image basis; and acquire the image selection data in response to the touch panel accepting the touch operation for selecting the one page of the plurality of pages displayed on the display unit on an image-by-image basis.

5. The mobile terminal device according to claim 1, further comprising a storage unit configured to store one of the printer and a different printer as a default printer, wherein the control device is further configured to:

transmit, in response to the touch panel accepting a print instructing operation, a print instruction to cause the default printer stored in the storage unit to print the selected one page or the selected two or more pages.

6. The mobile terminal device according to claim 1, wherein the control device is further configured to:

output screen data for controlling the display unit to display thereon a selection object for selecting all of the plurality of pages contained in the acquired document data;

wherein the touch panel comprises:

a first page selection accepting section configured to accept a first touch operation of individually touching for selecting one or more pages from among the plurality of pages displayed on the display unit; and a second page selection accepting section configured to accept a second touch operation of touching the selection object displayed on the display unit based on the screen data, and wherein the control device is further configured to:

acquire, in response to the first page selection accepting section accepting the first touch operation of individually touching for selecting the one or more pages from among the plurality of pages displayed on the display unit, image selection data for identifying the selected one or more pages; and acquire, in response to the second page selection accepting section accepting the second touch operation of touching the selection object displayed on the display unit, image selection data for identifying all of the plurality of pages contained in the acquired document data.

7. The mobile terminal device according to claim 1, wherein the control device is further configured to:

determine whether the plurality of pages contained in the acquired document data are individually displayable on the display unit;

when determining that the plurality of pages contained in the acquired document data are individually displayable on the display unit, output screen data for controlling the display unit to display thereon the plurality of pages contained in the acquired document data; and when determining that the plurality of pages contained in the acquired document data are individually displayable on the display unit:

transmit the acquired document data and a convert instruction to a server, the convert instruction causing the server to convert the acquired document data into image data and to transmit the image data to the mobile terminal device, the image data containing a plurality of images corresponding the plurality of pages, respectively, each of the plurality of images being individually displayable on the display unit, receive the image data from the server, and output the screen data for controlling the display unit to display thereon the plurality of images contained in the image data.

8. The mobile terminal device according to claim 1, wherein the document data is PDF data.

9. The mobile terminal device according to claim 1, wherein the control device is configured to, in response to determining that the near field wireless communication unit has established the near field wireless communication with the printer, determine whether the acquired document data contains only the single piece of page data or the plurality of pieces of page data.

10. The mobile terminal device according to claim 1, wherein the control device is configured to determine whether the near field wireless communication unit has established the near field wireless communication with the printer after acquiring the image selection data.

11. The mobile terminal device according to claim 10, wherein the control device is configured to, after the near field wireless communication, which is determined to have been established in response to the touch panel accepting the touch operation of touching the image for selecting document data, is terminated, determine whether the near field wireless communication unit has established the near field wireless communication with the printer in response to the touch panel accepting the touch operation of touching for selecting one or more [of] *images from among* the plurality of images displayed on the display unit.

12. A non-transitory computer readable medium storing computer readable instructions configured to, when executed by a processor connected with a display unit, a near field wireless communication unit, a touch panel, and a storage unit, cause the processor to perform:

display a screen on the display unit, the screen including an image for selecting document data stored in the storage unit;

in response to the touch panel accepting a touch operation of touching the image displayed on the display unit for selecting document data, perform:

acquiring the selected document data stored in the storage unit, the selected document data being one of data containing only a single piece of page data and data containing a plurality of pieces of page data;

when the acquired document data contains only a single piece of page data, displaying an image on the display unit based on the single page data;

when the acquired document data contains a plurality of pieces of page data, displaying a plurality of images on the display unit based on the plurality of pieces of page data, respectively; and determining whether the near field wireless communication unit has established near field wireless communication with a printer; and determining whether the acquired document data contains only a single piece of page data or a plurality of pieces of page data;

when determining that the near field wireless communication unit has established the near field wireless communication with the printer and determining that the acquired document data contains only a single piece of page data, transmitting a print instruction to print an image that is based on the single piece of page data contained in the acquired document data and displayed on the display unit, to the printer; and when determining that the acquired document data contains a plurality of pieces of page data, in response to the touch panel accepting a touch operation of touching for selecting one or more of the plurality of images displayed on the display unit based on the plurality of pieces of page data, respectively, perform:

acquiring image selection data for identifying one or more pieces of page data corresponding to the touched one or more of the plurality of image, respectively;

determining whether the near field wireless communication unit has established the near field wireless communication with the printer; and in response to determining that the near field wireless communication unit has established the near field wireless communication with the printer and acquiring the image selection data for identifying the one or more pieces of page data corresponding to the touched one or more of the plurality of images, respectively, transmitting a print instruction to print a plurality of images that are based on the one or more pieces of page data identified by the acquired image selection data, respectively and are based on the one or more pieces of page data corresponding to the touched one or more of the plurality of images, respectively, to the printer.

13. The non-transitory computer readable medium according to claim 12, wherein the computer readable instructions are further configured to cause the processor to perform:

outputting screen data for controlling the display unit to display the plurality of pages generated based on the acquired document data, side by side; and acquiring the image selection data in response to the touch panel accepting the touch operation for selecting the one page of the plurality of pages collectively displayed side by side on the display unit.

14. The non-transitory computer readable medium according to claim 12, wherein the computer readable instructions are further configured to cause the processor to perform:

outputting screen data for controlling the display unit to display the plurality of pages generated based on the acquired document data, on an image-by-image basis; and acquiring the image selection data in response to the touch panel accepting the touch operation for selecting the one page of the plurality of pages displayed on the display unit on an image-by-image basis.

15. The non-transitory computer readable medium according to claim 12, wherein the processor is further connected with a storage unit configured to store one of the printer and a different printer as a default printer, and wherein the computer readable instructions are further configured to cause the processor to perform:

transmitting, in response to the touch panel accepting a print instructing operation, a print instruction to cause the default printer stored in the storage unit to print the selected one page or the selected two or more pages.

16. The non-transitory computer readable medium according to claim 12, wherein the computer readable instructions are further configured to cause the processor to perform:

outputting screen data for controlling the display unit to display thereon a selection object for selecting all of the plurality of pages contained in the acquired document data;

wherein the touch panel comprises:

a first page selection accepting section configured to accept a first touch operation of individually touching for selecting one or more pages from among the plurality of pages displayed on the display unit; and a second page selection accepting section configured to accept a second touch operation of touching the selection object displayed on the display unit based on the screen data, and wherein the computer readable instructions are further configured to cause the processor to perform:

acquiring, in response to the first page selection accepting section accepting the first touch operation of individually touching for selecting the one or more pages from among the plurality of pages displayed on the display unit, image selection data for identifying the selected one or more pages; and acquiring, in response to the second page selection accepting section accepting the second touch operation of touching the selection object displayed on the display unit, image selection data for identifying all of the plurality of pages contained in the acquired document data.

17. The non-transitory computer readable medium according to claim 12, wherein the computer readable instructions are further configured to cause the processor to perform:

determining whether the plurality of pages contained in the acquired document data is individually displayable on the display unit;

when determining that the plurality of pages contained in the acquired document data are individually displayable on the display unit, outputting screen data for controlling the display unit to display thereon the plurality of pages contained in the acquired document data; and when determining that the plurality of pages contained in the acquired document data are individually displayable on the display unit:

transmitting the acquired document data and a convert instruction to a server, the convert instruction causing the server to convert the acquired document data into image data and to transmit the image data to a mobile terminal device, the image data containing a plurality of images corresponding the plurality of pages, respectively, each of the plurality of images being individually displayable on the display unit, receiving the image data from the server, and outputting the screen data for controlling the display unit to display thereon the plurality of images contained in the image data.

18. The non-transitory computer readable medium according to claim 12, wherein the computer readable instructions are further configured to cause the processor to perform:

in response to determining that the near field wireless communication unit has established the near field wireless communication with the printer, determining whether the acquired document data contains only the single piece of page data or the plurality of pieces of page data.

19. The non-transitory computer readable medium according to claim 12, wherein the computer readable instructions are further configured to cause the processor to perform:

determining whether the near field wireless communication unit has established the near field wireless communication with the printer after acquiring the image selection data.

20. The non-transitory computer readable medium according to claim 19, wherein the computer readable instructions are further configured to cause the processor to perform:

after the near field wireless communication, which is determined to have been established in response to the touch panel accepting the touch operation of touching the image for selecting document data, is terminated, determining whether the near field wireless communication unit has established the near field wireless communication with the printer in response to the touch panel accepting the touch operation of touching for selecting one or more of the plurality of images displayed on the display unit.

21. A mobile terminal device comprising:

a display unit;

a near field wireless communication unit;

a touch panel; and a storage unit;

a control device configured to:

display a screen on the display unit, the screen including an image for selecting document data stored in the storage unit;

in response to the touch panel accepting a touch operation of touching the image, displayed on the display unit, for selecting document data, perform:

acquiring the selected document data stored in the storage unit, the selected document data being one of data containing only a single piece of page data and data containing a plurality of pieces of page data;

when the acquired document data contains only a single piece of page data, displaying an image on the display unit based on the single page data;

when the acquired document data contains a plurality of pieces of page data, displaying a plurality of images on the display unit based on the plurality of pieces of page data, respectively; and determining whether the near field wireless communication unit has established near field wireless communication with a printer; and;

determine whether the acquired document data contains only a single piece of page data or a plurality of pieces of page data;

when determining that the near field wireless communication unit has established the near field wireless communication with the printer and determining that the acquired document data contains only a single piece of page data, transmit a print instruction to print an image that is based on the single piece of page data contained in the acquired document data and is displayed on the display unit, to the printer; and when determining that the acquired document data contains a plurality of pieces of page data, either in response to the touch panel accepting a first touch operation of individually touching for selecting one or more of the plurality of images displayed on the display unit based on the plurality of pieces of page data, respectively, or in response to the touch panel accepting a second touch operation of touching for selecting all of the plurality of images displayed on the display unit based on the plurality of pieces of page data, respectively, perform:

acquiring, in response to the touch panel accepting the first touch operation, image selection data for identifying the one or more pieces of page data corresponding to the touched one or more of plurality of images, respectively;

acquiring, in response to the touch panel accepting the second touch operation image selection data for identifying all of the plurality of pages corresponding to the touched all of the plurality of images;

determining whether the near field wireless communication unit has established the near field wireless communication with the printer;

in response to determining that the near field wireless communication unit has established the near field wireless communication with the printer and acquiring image selection data for identifying the one or more pieces of page data corresponding to the touched one or more of the plurality of images, respectively, transmitting a print instruction to print a plurality of images that are based on the one or more pieces of page data identified by the acquired image selection data, respectively and are based on the one or more pieces of page data corresponding to the touched one or more of the plurality of images, respectively, to the printer; and in response to determining that the near field wireless communication unit has established the near field wireless communication with the printer and acquiring image selection data for identifying the plurality of pieces of page data corresponding to the touched all of the plurality of images, respectively, transmitting a print instruction to print all of the plurality of images that are based on the plurality of pieces of page data identified by the acquired image selection data, respectively and are based on the plurality of pieces of page data corresponding to the touched all of the plurality of images, respectively, to the printer.

22. A non-transitory computer readable medium storing computer readable instructions configured to, when executed by a processor connected with a display unit, a near field wireless communication unit, a touch panel, and a storage unit, cause the processor to perform:

display a screen on the display unit, the screen including an image for selecting document data stored in the storage unit;

in response to the touch panel accepting a touch operation of touching the image displayed on the display unit for selecting document data, perform:

acquiring the selected document data stored in the storage unit, the selected document data being one of data containing only a single piece of page data and data containing a plurality of pieces of page data;

when the acquired document data contains only a single piece of page data, displaying an image on the display unit based on the single page data;

when the acquired document data contains a plurality of pieces of page data, displaying a plurality of images on the display unit based on the plurality of pieces of page data, respectively; and determining whether the near field wireless communication unit has established near field wireless communication with a printer; and determining whether the acquired document data contains only a single piece of page data or a plurality of pieces of page data;

when determining that the near field wireless communication unit has established the near field wireless communication with the printer and determining that the acquired document data contains only a single piece of page data, transmitting a print instruction to print an image that is based on the single piece of page data contained in the acquired document data and displayed on the display unit, to the printer;

when determining that the acquired document data contains a plurality of pieces of page data, either in response to the touch panel accepting a first touch operation of individually touching for selecting one or more of the plurality of images displayed on the display unit based on the plurality of pieces of page data, respectively, or in response to the touch panel accepting a second touch operation of touching for selecting all of the plurality of images displayed on the display unit based on the plurality of pieces of page data, respectively, perform:

acquiring, in response to the touch panel accepting the first touch operation, image selection data for identifying the one or more pieces of page data corresponding to the touched one or more of plurality of images, respectively;

acquiring, in response to the touch panel accepting the second touch operation image selection data for identifying all of the plurality of pages corresponding to the touched all of the plurality of images;

determining whether the near field wireless communication unit has established the near field wireless communication with the printer;

in response to determining that the near field wireless communication unit has established the near field wireless communication with the printer and acquiring image selection data for identifying the one or more pieces of page data corresponding to the touched one or more of the plurality of images, respectively, transmitting a print instruction to print a plurality of images that are based on the one or more pieces of page data identified by the acquired image selection data, respectively and are based on the one or more pieces of page data corresponding to the touched one or more of the plurality of images, respectively, to the printer; and in response to determining that the near field wireless communication unit has established the near field wireless communication with the printer and acquiring image selection data for identifying the plurality of pieces of page data corresponding to the touched all of the plurality of images, respectively, transmitting a print instruction to print all of the plurality of images that are based on the plurality of pieces of page data identified by the acquired image selection data, respectively and are based on the plurality of pieces of page data corresponding to the touched all of the plurality of images, respectively, to the printer.

*23. The mobile terminal device according to claim 1, wherein the control device is further configured to transmit a print instruction to print the selected images in response to the touch panel accepting a touch operation of touching an image displayed on the display unit, the touch operation being performed to transmit the print instruction after acquiring the image selection data for identifying the one or more pieces of page data corresponding to the selected images, respectively.*

* * * * *